(12) United States Patent
Nakhasi et al.

(10) Patent No.: US 7,678,399 B2
(45) Date of Patent: Mar. 16, 2010

(54) PHYTOSTEROL CONTAINING DEEP-FRIED FOODS AND METHODS WITH HEALTH PROMOTING CHARACTERISTICS

(75) Inventors: Dilip K. Nakhasi, Bourbonnais, IL (US); Roger L. Daniels, Manhattan, IL (US); Joshua W. Eartly, Wilmington, IL (US)

(73) Assignee: Bunge Oils, Inc., St. Louis, MO (US)

( * ) Notice: Subject to any disclaimer, the term of this patent is extended or adjusted under 35 U.S.C. 154(b) by 1105 days.

(21) Appl. No.: 11/294,295

(22) Filed: Dec. 5, 2005

(65) Prior Publication Data

US 2007/0128330 A1 Jun. 7, 2007

(51) Int. Cl.
*A23L 1/00* (2006.01)
(52) U.S. Cl. ........................ 426/438; 426/611
(58) Field of Classification Search ............ 426/601, 426/438, 611, 606, 607
See application file for complete search history.

(56) References Cited

U.S. PATENT DOCUMENTS

| | | | |
|---|---|---|---|
| 5,578,334 A | 11/1996 | Sundram et al. | |
| 5,843,497 A | 12/1998 | Sundram et al. | |
| 5,932,562 A | 8/1999 | Ostlund, Jr. | |
| 6,031,118 A | 2/2000 | van Amerongen et al. | |
| 6,087,353 A | 7/2000 | Stewart et al. | |
| 6,106,886 A | 8/2000 | van Amerongen et al. | |
| 6,162,483 A | 12/2000 | Wester | |
| 6,352,737 B1 | 3/2002 | Dolhaine et al. | |
| 6,441,206 B1 | 8/2002 | Mikkonen et al. | |
| 6,576,285 B1 | 6/2003 | Bader et al. | |
| 6,589,588 B1 | 7/2003 | Wester et al. | |
| 6,638,547 B2 | 10/2003 | Perlman et al. | |
| 6,677,327 B1 | 1/2004 | Gottemoller | |
| 6,677,469 B1 | 1/2004 | Dunford et al. | |
| 6,793,959 B2 | 9/2004 | Nakhasi et al. | |
| 6,800,317 B2 | 10/2004 | Wester et al. | |
| 6,929,816 B2 | 8/2005 | Wester | |
| 2002/0016314 A1 | 2/2002 | Schersl | |
| 2002/0107232 A1 | 8/2002 | Flickinger et al. | |
| 2002/0160990 A1 | 10/2002 | Burdick et al. | |
| 2003/0003131 A1 | 1/2003 | Dyer et al. | |
| 2003/0096035 A1 | 5/2003 | Perlman et al. | |
| 2003/0175402 A1 | 9/2003 | Wester | |
| 2004/0014733 A1 | 1/2004 | Binder et al. | |
| 2004/0047969 A1 | 3/2004 | Wester et al. | |
| 2004/0156972 A1 | 8/2004 | Nishide et al. | |
| 2004/0219277 A1 | 11/2004 | Wester | |
| 2004/0247658 A1 | 12/2004 | Trubiano et al. | |
| 2005/0038270 A1 | 2/2005 | Flickinger et al. | |
| 2005/0042355 A1 | 2/2005 | Perlman et al. | |
| 2005/0054621 A1 | 3/2005 | Gako-Golan et al. | |
| 2005/0064078 A1 | 3/2005 | Nasser et al. | |
| 2005/0067726 A1 | 3/2005 | Yan et al. | |
| 2005/0079258 A1 | 4/2005 | Wester et al. | |
| 2005/0175745 A1 | 8/2005 | Zawistowski | |
| 2005/0196512 A1* | 9/2005 | Nakhasi et al. | 426/601 |
| 2006/0251790 A1* | 11/2006 | Perlman et al. | 426/601 |
| 2007/0054028 A1* | 3/2007 | Perlman et al. | 426/601 |

FOREIGN PATENT DOCUMENTS

WO      WO 03/064444 A1      8/2003

OTHER PUBLICATIONS

2004 Elsevier Ltd—Food and Chemical Toxicology 42 (2004) 771-783—Safety evaluation of phytosterol esters. Part 8. Lack of genotoxicity and subchronic toxicity with phytosterol oxides—L.J. Lea, et al.
2003 American Society for Nutritional Sciences—Nutrient-Gene Interactions—The Human Cholesteryl Ester Transfer Protein 1405V Polymorphism Is Associated with Plasma.
Cholesterol Concentration and Its Reduction by Dietary Phytosterol Esters—Ana M. Lottenberg, et al.
Eur J Lipid—Sci Technol 102 (2000) 543-551—Testing and comparing oxidative stability of vegetable oils and fats at frying temperature—Christian Gertz, et al.

* cited by examiner

*Primary Examiner*—Carolyn A Paden
(74) *Attorney, Agent, or Firm*—Cook Alex Ltd.

(57) ABSTRACT

Deep frying oils combined with phytosterols are instrumental in deep-fried food products and methods for enhancing health characteristics. The deep frying compositions have a phytosterol ester content of up to about 50 weight percent, and at least about 50 weight percent of the phytosterols are transferred into the food product.

28 Claims, 3 Drawing Sheets

PHYTOSTEROL CONTAINING DEEP-FRIED FOODS AND METHODS WITH HEALTH PROMOTING CHARACTERISTICS

BACKGROUND OF THE INVENTION

1. Field of the Invention

This invention generally relates to compositions of edible oils and phytosterol esters and the use of these compositions for preparing foods having cholesterol reduction characteristics. More particularly, the invention relates to compositions containing phytosterol esters for use as deep frying edible oils to prepare deep-fried food products that promote health and nutrition enhancement, including cholesterol reduction, when such deep-fried foods are consumed by living beings, especially humans.

2. Description of Related Art

Vegetable-based edible oils and compositions long have been used in baking, frying and food dressing applications. Edible oil products provide taste, nutrition and anti-stick properties for any number of pan frying, belt frying, baking, dressing or similar types of uses and applications. Edible oil products of this general type include liquid oils, cooking oils, margarines, whipped spreads, tub margarines, shortenings, oils, sprayable compositions, salad dressings and the like. These types of edible oil uses and applications can be categorized as edible oil compositions that are formulated to be used at relatively low temperatures and without substantial agitation. Such compositions are not suitable for so-called "deep frying" or "deep fat frying" applications.

In contrast, other edible oil components or compositions are provided that are suitable for such "deep frying" or "deep fat frying". In deep frying applications, foods are fully immersed in the deep frying fat or edible oil which is at an elevated temperature suitable for such deep frying. Typical deep frying temperatures are at least about 350° F. (at least about 177° C.), often at least about 180° C. (at least about 356° F.). In addition, largely due to these relatively high temperatures and the content and temperature of foods that are deep-fried, deep frying conditions are under substantial agitation. In essence, deep frying "bubbles" the oil in association with air developed during heating. Thus, deep frying conditions are significantly harsher that the lower temperature uses noted above, such lower-temperature uses including pan frying and belt frying of foods such as potato chips.

Also contributing to harshness in deep frying operations is the make up of foods that typically are deep-fried. Many such foods are battered such as with bread crumbs, flour, spices, salt, egg and the like. Many frozen foods have ice crystals on their surface which adds water and volatility to the deep frying. All of these are extraneous to the food and to the oil, creating an oxidation environment that can be detrimental to food and oil quality. These extraneous materials can be considered "pro-oxidants" which catalyze, in the high temperature agitating environment of deep frying, undesirable break down of components in the oil. It has been found, in keeping with the invention, that such pro-oxidants will break down or damage phytosterols that are not chemically protected and/or dissolved in the deep frying oil. A discussion of oxidation in deep frying in the general context of oils and phytosterol fractions is found in Gertz et al., "Testing and Comparing Oxidative Stability of Vegetable Oils and Fats at Frying Temperature," *European Journal Lipid Science Technology*, Vol 102, pages 543-551, 2000.

In the health, nutrition and metabolism art, publications suggest the usefulness of phytosterols in oil-based compositions. References which are in this general field include St-Onge, et al., "Consumption of a Functional Oil Rich in Phytosterols and Medium-Chain Triglyceride Oil Improves Plasma Lipid Profiles In Men," *American Society for Nutritional Sciences*, 0022-3166/03, (2003), *Journal of Nutrition*, Volume 133, pages 1815-1820, (2003) reports a study evaluating the effects of a combination of medium chain triglyceride oil, phytosterols and flaxseed oil on plasma lipid concentrations and LDL particle size. Another article discussing plant sterols or phytosterols is St-Onge, et al., "Phytosterols and Human Limpid Metabolism: Efficacy, Safety and Novel Foods," *Lipids*, Volume 38, No. 4, pages 367-375, (April, 2003). This article reports on studies regarding cholesterol-lowering efficacy of plant sterols with a view toward greater use of phytosterols in heart health promotion. These references, and each of the publications and patents noted throughout herein, are incorporated by reference hereinto.

References of Forbes Medi-Tech Inc also discuss phytosterol compositions. For example, Zawistowski et al., "Ruducol™-Cholesterol Lowering Functional Foods Phytosterols", *Innovations in Food Technology*, May 2003, mentions clinical studies which show that phytosterol mixtures added to foods lower plasma LDL-cholesterol levels in humans. Stewart et al. U.S. Pat. No. 6,087,353 describes phytosterol compositions which are esterified and subsequently hydrogenated. These are said to be suitable for use alone or for incorporation into foods, beverages, pharmaceuticals, nutraceuticals, and the like. Zawistowski et al., International Publication No. WO 01/91587 describes oil compositions comprising short, medium and long chain triglycerides and the use thereof in reducing weight gain. Zawistowski et al. also discusses phytosterols, which incorporates phytostanols as noted therein. These phytochemicals are presently believed to have an ability to decrease serum cholesterol levels when fed to a number of mammalian species, including humans. Zawistowski et al. indicates that the relationship between cholesterol and phytosterol is apparently due in part to similarities in the respective cholesterol and phytosterol chemical structures. The mechanism set forth in references such as these is that phytosterols displace cholesterol from the micellar phase to reduce its absorption or compete with cholesterol in its absorption process.

Lottenberg et al., "The Human Cholesterol Ester Transfer Protein 1405V Polymorphism is Associated with Plasma Cholesterol Concentration and its Reduction by Dietary Phytosterol Esters", *American Society for Nutritional Sciences*, 2003, indicates that margarine containing esterified polysterols lowers LDL-cholesterol without modifying HDL-cholesterol. Lea et al., "Safety Evaluation of Phytosterol Esters. Part 8. Lack of Genotoxicity and Subchronic Toxicity with Phytosterol Oxides", *Food and Chemical Technology*, Vol. 42, pages 771-783, 2004, describes phytosterol esters modified to phytosterol oxides after heating. Perlman et al., U.S. Pat. No. 6,638,547, U.S. Patent Application Publication No. 2003/0096035 and U.S. Patent Application Publication No. 2005/0042355 describe converting non-esterified or "free" phytosterols to triglyceride-recrystallized phytosterols.

Nidishi et al. U.S. Patent Application Publication No. 2004/0156972 describes a non-deep frying cooking oil of triglyceride oil containing a plant sterol. Phytosterol esters are described in Wester U.S. Pat. No. 6,929,816 as texturizing agents in non-deep frying formulations incorporating hardstock oils.

Heretofore, it has not been appreciated that the combination of deep frying edible oil technology and phytosterol ester technology to provide deep frying compositions would be especially advantageously applied to the task of improving health by reducing undesirable cholesterol levels upon consumption of foods that have been prepared by deep frying in the deep frying edible oil composition. An especially important problem in this regard, which is addressed by the deep frying composition according to the invention, is to impart positive health attributes to deep-fried foods that otherwise may be perceived to have unhealthy attributes. The solution involves formulating deep frying compositions to favor transference of phytosterol esters to the deep-fried foods during the deep frying process itself.

The present invention substantially enhances deep-fried foods by incorporating phytosterols thereinto in order to thereby lower cholesterol levels in a subject by having the subject consume deep-fried foods. This is accomplished without degrading the flavor or other sensory attributes or the color of the deep-fried food products and without detrimentally affecting the frying or cholesterol-lowering performance of the deep frying composition. Also, substituting for a portion of the frying shortening potentially reduces some percentage of saturated fat consumed.

SUMMARY OF THE INVENTION

In accordance with the present invention, products are provided which can be used in place of, or in combination with, conventional deep frying edible oil products or compositions. These products are compositions of edible oils that are well suited to the rigors of deep frying in combination with a phytosterol ester component. These products have as a principal component an edible oil that has high heat resistance properties which import to the composition the ability to function well as a deep frying oil for a minimum of five hours. Typically this functioning is intended to proceed for 25 hours and above. Such deep frying oils are combined with phytosterol esters into the cholesterol-lowering oil compositions. When desired, these compositions can be formulated with other components for providing a selected intended use. When foods are subjected to deep frying in such oil compositions, there is a beneficial and novel transference of cholesterol-lowering properties to the food product in order to provide a health-enhanced deep-fried food.

A general aspect or object of the present invention is to provide compositions which combine deep frying edible oils with phytosterol esters to provide compositions suitable for deep frying foods, as well as the deep-fried foods formed thereby and that have health promotion benefits for individuals who ingest the deep-fried foods.

An aspect or object of the present invention is that it provides phytosterol sources transferred to deep-fried foods, for the purpose of enhancing health by reducing LDL cholesterol levels in individuals who consume the deep-fried foods.

Another aspect or object of this invention is that it provides phytosterol components within deep frying oil compositions in a form that is resistant to oxidation during the agitation and high heat of deep frying conditions without experiencing any substantial decrease in performance or degradation in flavor or other sensory attributes.

Another aspect or object of the present invention is providing a process for accomplishing the addition of cholesterol-lowering components to deep-fried foods, thereby providing health promotion in a form which facilitates consumption for reaping the benefits of the composition in humans or other mammals.

Another aspect or object of this invention is that it provides an improved method for delivering phytosterol compounds within deep-fried foods so as to lower undesirable cholesterol values.

Another aspect or object of the present invention is that there is a transference of at least about 50 weight percent of the phytosterol component present in the deep frying oil composition into the deep-fried food product.

Other aspects, objects and advantageous of the present invention will be understood from the following description according to the preferred embodiments of the present invention, specifically including stated and unstated combinations of the various features which are described herein, relevant information concerning which is shown in the accompanying drawings.

BRIEF DESCRIPTION OF THE DRAWINGS

In describing the preferred embodiments of the present invention, reference will be made to the accompanying drawings, wherein.

DESCRIPTION OF THE PREFERRED EMBODIMENTS

Figure 1:
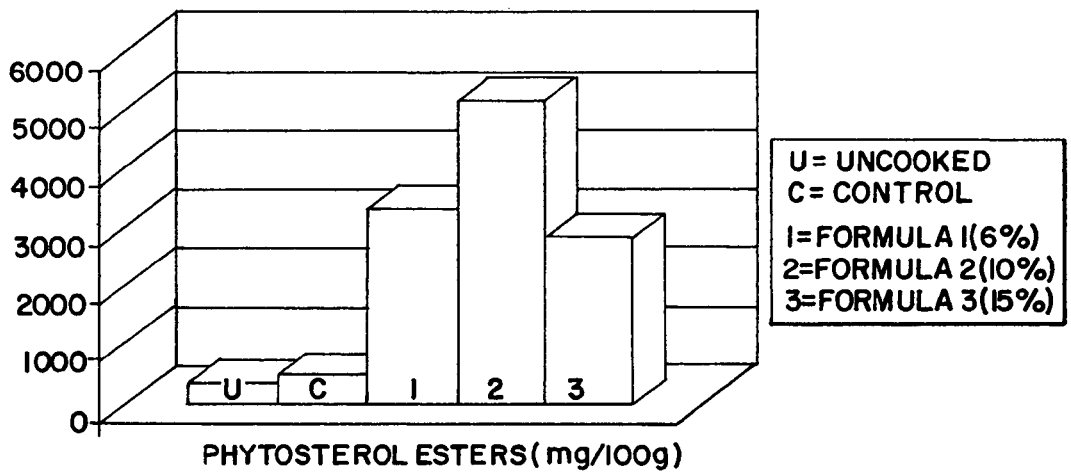
FIG. 1 is a bar graph plot reporting phytosterol ester contents within onion rings deep-fried in different deep frying oil compositions.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The present invention relates to deep frying compositions containing edible oil components that function well under deep frying conditions. Thus, such edible oil components are intended for use under deep frying temperatures of at least about 350° F. (about 177° C.) and under harsh agitation conditions typically encountered in deep frying vats. One of skill in the art will appreciate the meaning of a deep frying edible oil. They include triacylglycerols, diglycerides and combinations thereof. Triacylglycerols generally are preferred as they have been found to be a better carrier than for example diglycerides for the cholesterol treatment components so as to transfer same to foods products deep-fried in the composition of the invention.

Stable triacylglycerols have been found to be important to provide superior migration into the foods according to the invention. Without stable triacylglycerols, the migration rate has been observed to drop. Stability can be enhanced by the absence of peroxides in the deep frying composition. Whichever deep frying edible oil is chosen, it preferably is a liquid oil. Hydrogenation typically need not be carried out. Known deep frying edible oils suitable for incorporation into the present compositions are liquid at room temperature, and typically the deep frying compositions also are liquid at room temperature.

These deep frying edible oils include vegetable originating oils. These include so-called domestic oils. Domestic oils include soybean oil, low linolenic acid soybean oil, corn oil, cottonseed oil, canola oil, safflower oil, sunflower oil, peanut oil, all types of olive oil, and oil from grain plants. Typical oils of these types are well recognized as so-called long chain lipids. Chain lengths of these oils generally lie between C16 and C22, as will be generally appreciated in the art. Preferably, these are substantially unsaturated oils which are well known in the art as liquid oil commodities. Certain specialty oils also are encompassed within the domestic oils. These include identity preserved canola oils and refined, bleached and deodorized high stable oils. Included is naturally high stable canola oil such as NATREON™ oil (available from Dow Agro Sciences, Canbra Foods), which is naturally higher in monounsaturated fats and in oleic fatty acid and lower in linolenic fatty acid. In this regard, Sornyk et al U.S. Pat. No. 5,965,755 and Lanuza et al. U.S. Pat. No. 6,169,190 are noted and incorporated by reference.

In preparing the deep frying compositions according to the invention, the deep frying edible oil is combined with one or more phytosterol esters and/or phytostanol esters to form a composition which can be used directly as a deep frying edible oil product, or also be combined with other components to make up the desired final product, as will be generally appreciated by those skilled in the art. However, components such as water should not be included as they will not perform properly under deep frying conditions; for example, having water in the composition will result in spattering which is very undesirable in deep frying operations. Products such as margarines include water and are not suitable for deep frying.

Compositions according to the invention include the deep frying edible oil at levels between about 50 and about 95 weight percent, based upon the total weight of the deep frying composition. Typically the deep frying oils will be present at between about 70 and about 95 weight percent, preferably between about 82 and about 95 weight percent. The phytosterol ester component, at times referred to herein as the phytosterol component, will be included at levels of not greater than about 50 weight percent, typically between about 5 and about 50 weight percent, preferably between about 5 and about 30 weight percent, based on the total weight of the deep frying composition. Most preferably, the phytosterol component will be present at between about 5 and about 18 weight percent. In many applications, especially preferred phytosterol ester levels are between about 8 and about 12 weight percent.

With further reference to the phytosterol components that are combined with the deep frying edible oil according to the invention, specific details concerning phytosterol components can be found in U.S. Pat. No. 6,117,475, No. 6,139,897, No. 6,277,431, US Patent Application Publications No. 2002/0031595 and No. 2002/0045000, and International Publications No. WO 01/13733, No. WO 01/32029 and No. WO 01/91587. Specific details concerning phytosterol esters and microparticles of phytosterol esters are found in U.S. Pat. No. 6,087,353 and U.S. Patent Application Publication No. 2002/0048606. As noted previously, each of these patents and patent publications is incorporated by reference hereinto.

The term "phytosterols" when referring to the components used in the compositions according to the present invention encompass phytosterols and/or phytostanols or derivatives of these types of compounds. It is recognized that the presence of the sterol component is useful in lowering serum cholesterol and serum triacylglycerols levels, as well as enhancing overall dietary efficacy. It is generally accepted, but not with certainty, that this can be explained by similarities between their respective chemical structures. By this explanation, the phytosterol displaces cholesterol from the micellar phase, thereby reducing cholesterol absorption and/or competing with receptor and/or carrier sites in the cholesterol absorption process.

The phytosterols should be present as esters within the deep frying composition. Phytosterol esters are known to be miscible in edible oils, as opposed to free phytosterols that only can be dispersed in edible oils such as the deep frying edible oil composition. The ester form as thus miscible withstands the harsh conditions of deep frying and will not be damaged under these high heat and agitation conditions as would a dispersed free phytosterol. The phytosterol ester component has a significant antioxidant benefit within the deep frying environment. In keeping with the invention, the deep frying composition achieves penetration of the phytosterol ester component into the food itself, and not only on its surface. Such penetration maximizes the ability of the phytosterol to be ingested by the individual and thus enhance the effectiveness of the phytosterol component present within the deep frying composition.

Examples of compounds which fall within a meaning of "phytosterol" include sitosterol, campesterol, stigmasterol, brassicasterol, demosterol, chalinosterol, poriferasterol, coioanasterol, and natural or synthesized forms or derivatives, including isomers. Also included are compounds identified by the term phytostanol, including saturated or hydrogenated phytosterols and all natural or synthesized forms and derivatives, including the isomers. It will be appreciated that these components can be modified, such as adding side chains and also fall within the preview of the term phytosterol.

Phytosterols are typically attained from natural sources, most typically from the processing of plant oils or marine oils. Sources include vegetable oils and fish oils, vegetable oils include corn oil, wheat germ oil, soy extract, rice extract, rice bran, canola oil and sesame oil. Other sources can include tall oil pitch or soap such as those which are byproducts of the forestry industry.

Phytosterol esters are available from public sources, including from Forbes Medi-Tech, Inc. An example is PHYTROL®, a registered trademark of Forbes Medi-Tech, Inc. Compositions are sold under this brand name as cholesterol lowering agents. A typical such composition is composed of plant sterols and stanols having 14.5% campesterol, 2.4% campostanol, 50.9% beta-sitosterol, and 18.9% sitostanol. The PHYTROL® product is a fine crystalline waxy powder. Its particle size characteristic is such that greater than 80% of the particles pass through a 0.8 mm sieve and greater than 98% of the particles pass through a 2.0 mm sieve. PHYTROL® phytosterol compositions comprise from 38 to 79 weight percent sitosterol, based on the total weight of the anhydrous composition, 4 to 25 weight percent of campesterol, 6 to 18 weight percent sitostanol, and 0 to 14 weight percent campostanol. At least 97 weight percent of the components are in the form of a sterolester, and no more than 3 weight percent are free sterols. An exemplary sterolester in this regard is a phyto-5-sterol-10 ester. Such has a softening point of between 15° C. and 30° C. and is substantially insoluble in water at 25° C. Such a sterolester is liquid above 40° C.

With more particular reference to the phytosterol ester component, it may be that the quantity of stanol structures included in this component is better to be minimized. The stanol structure is associated with hydrogenization is associated with trans-isomer structures, which have been the subject of negative health concerns. In addition, excessive hydrogenization detrimentally affects clarity of the compositions. Typically, the stanol or phytostanol content in the phytosterol ester components according to the invention will be no greater than about 20 weight percent, based upon the total weight of the phytosterol ester component. Preferably, the amount of stanol or phytostanol compounds within the phytosterol ester component is not greater than about 15 weight percent.

In proceeding with a method for making the deep frying compositions according to the invention, at least about 50 weight percent of the deep frying edible oil described herein is blended with not more than about 50 weight percent of a phytosterol ester component, both based upon the total weight of the composition. Other components can be blended in as generally discussed herein.

In use, these deep frying compositions are deposited into a deep frying vat such as those having self-contained heating elements and one or more removable baskets within which the food for deep frying is placed while the heating elements achieve and maintain the deep frying oil composition at a deep frying temperature. The deep frying composition is agitated by virtue of the elevated temperature and insertion of a food product, often in a frozen state, thereinto. It has been determined that, by proceeding according to the present invention, at least about 50 weight percent of the phytosterol component of the deep frying composition during this deep frying use is transferred into the deep-fried food product. Often this transference is at least about 60 weight percent, or 70 weight percent.

This transference of the phytosterol esters into the food as discussed herein provides an excellent and appetizing source of phytosterol component that serves as an adjunct to lower LDL cholesterol levels and raise HDL to LDL ratios in individuals who ingest the food on a sustained basis.

Administration of the phytosterol component though food products according to the invention can be made at advantageous levels when included within a monitored diet. For example, for an adult male, ingesting 1.3 grams per day of phytosterols, according to the US Food and Drug Administration, may reduce the risk of heart disease in association with a low saturated fat and low cholesterol diet.

Administration doses present within a food serving deep-fried according to the invention typically can be at least about 100 milligrams of the transferred phytosterol component, which is a portion of the daily requirement for an adult male. A typical preferred and attainable range is between about 100 mg and about 500 mg of phytosterol component in the food per product "reference amount." In connection with the invention, this is the amount of phytosterol transferred into the food during deep frying of the food. The term "reference amount" is defined as the amount of food customarily consumed per eating occasion by a person 4 years of age and older. These reference amounts are based on data developed in food consumption surveys. Details for various foods are found at 21 CFR 101.12, U.S. Food and Drug Administration, Department of Health and Human Services, hereby incorporated herein by reference.

In an exemplary diet, one piece of deep-fried chicken can weigh about 85 grams, which is the "reference amount" for cooked chicken without sauce according to 21 CFR 101.12. When deep-fried according to the invention, it will contain on the order of at least about 130 mgs of phytosterols, which is about 20% of the Daily Value (DV) for an adult male. Thus, a consistent diet including such a deep-fried chicken serving has the ability of lowering LDL cholesterol, raising HDL cholesterol and/or raising the HDL/LDL cholesterol ratio.

Examples are now provided in order to illustrate the concepts of the invention with a certain degree of specificity.

Example 1

Three five pound batches of deep frying oil were prepared by physically blending deep frying oil and phytosterol esters in three blend percentages or formulas. Each contained canola oil as the deep frying edible oil, namely NUTRA-CLEAR VTF®, which is a high oleic canola oil of Bunge Oils, Inc. The phytosterol esters were a blend of sitosterol ester (46 weight percent), campesterol ester (27 weight percent), stigmasterol ester (23 weight percent) and other minor phytosterol esters (4 weight percent). Formula 1 contained 94 weight percent of the deep frying oil and 6 weight percent of the phytosterol esters. Formula 2 contained 90 weight percent deep frying oil and 10 weight percent phytosterol esters. Formula 3 contained 85 weight percent deep frying oil and 15 weight percent phytosterol esters. Also tested was a Control that was 100% of the deep frying oil. Multiple runs of each Formula and Control oil were conducted.

Each test batch was filled into a 6-quart FRY DADDY™ deep fryer (Model # 0600004, supplied by Presto Industries, Inc., Eau Claire, Wis.) which is a deep frying vat machine having a capacity suitable for 5 pound batches of deep frying oil. Each Formula and Control deep frying oil was used to deep fry foods that are known in the industry as presenting difficult deep frying challenges because of their ability to efficiently break down deep frying oil used to prepare such foods. These two food types were chicken nuggets (300 grams each batch) and beer batter onion rings (250 grams each batch).

Each oil batch was heated to approximately 350° F. within the deep frying vat before the food products were added. The oil temperature was monitored using temperature probes equipped with chart recorders. During the experiment comparing Formula 1 with the Control, the temperature probe was in the way of the basket of the deep frying machine, and it was removed prior to insertion of the food. For all other experiments, the probe position was moved to allow for the basket to be inserted without the probe needing to be removed. All of the used oil was collected in respective one gallon containers, and each was blanketed with nitrogen and stored at ambient temperature.

Each batch of oil (Formulas 1, 2 and 3 and Control) was submitted for analysis at the following times: before heating (baseline), after initial heating to 350° F., after all four chicken nugget batches, and after all four beer battered onion ring batches. The food was also submitted for analysis at the following times: frozen (250 g) and composite (250 g) samples after the food was fried. The amounts of the food samples were determined by the fat content in grams and the amount of fat needed to run the analysis.

The following observations were made concerning the deep frying experiments and products deep-fried. In general, the experiences in the deep frying oils in the runs of Formulas 1, 2 and 3 were superior to those of the comparative runs using the Control deep frying oil.

Concerning the Control runs, the first run of chicken produced a substantial amount to foam that took approximately 45 second to dissipate. The batches of chicken nuggets from the first Control fry did not have a golden brown hue and were not crispy either. Once the nuggets were opened up, it was observed that the meat inside did not set entirely. After the second, third and fourth Contact runs were completed, the golden brown hue became more noticeable and the chicken became crisper. The delay in the browning of the samples is related to the "breaking in" of the oil which is typical for normal deep frying oil usage. The batches of onion rings fried relatively the same in all four Control runs. The onion rings came out with a brown hue and crispy.

No smoke or foaming was observed in any of the four Control runs for onion rings. The second and third runs of chicken both produced foam on the initial fry but it dissipated quickly. The oil seemed to have "broken in" more quickly during the second and third runs, for the chicken had a golden brown hue and pleasant crispiness. The Control deep-fried chicken was not as crisp as the runs of Formulas 1, 2 and 3, but the samples still maintained levels that were acceptable. The onion rings in the second and third Control runs were all browned and were crispy. Slight smoking was observed on the fourth batch of onion rings during the second Control run.

Concerning each of Formulas 1, 2 and 3, the chicken deep-fried during the first run for each batch was noted as being slightly crunchier than the Control, which is believed to be attributed to a decrease in "break in" time due to the addition of unsaponified material in the Formulas. Less foaming was observed for each of Formulas 1, 2 and 3 in comparison to the Control side of the deep frying vat during the first batch of chicken. A slight plume or puff of smoke was observed during the third chicken run for Formula 3. No significant observations were made during the onion ring runs. The first chicken run of Formula 2 produced a significant amount of foam which dissipated much faster then the amount of foam generated by the Controls. The chicken was still crunchier then the Control. The onion ring runs of Formulas 1, 2 and 3 that were a bit lighter in color, but not to an unfavorable degree. The chicken runs for the Formula 3 runs produced little to no foam. The onion ring runs produced smoke during the second and third runs of Formula 3 and an overall soggier undesirable onion ring during these runs.

An informal taste test was performed on all of these deep-fried foods, with the following results. Compared with their respective Controls, the chicken nuggets made in the respective deep frying oils of Formula 1 and Formula 2 were crunchier than the chicken nuggets made in the respective runs for the Control deep frying oil. This is a desirable improvement which was not accompanied by any degradation in flavor sensory qualities. The same observations were made with respect to the ones made in deep frying the onion rings. While the runs with the Formula 3 oil were as noted hereinabove concerning crunchy sensory characteristics, a very "earthy" off-note began to develop and became more noticeable as time in the experiment elapsed, that is as the runs using the Formula 3 oil progressed.

Example 2

The onion rings and chicken nuggets deep-fried in accordance with Example 1 were analyzed for fat content per serving. In the case of the onion rings, this was based on a serving size of 91 grams. The uncooked onion rings contained 3.69 grams of fat. After deep frying in the Control oil, the onion rings contained 14.17 grams of fat, or a difference of 10.48 grams, representing that retained on the onion rings after the deep fat frying. For Formula 1, the deep-fried onion rings contained 16.08 grams of fat, representing a fat retention of 12.39 grams. For Formula 2, the deep-fried onion rings contained 11.15 grams of fat, representing a fat retention of 7.46 grams. The onion rings deep-fried in the Formula 3 oil composition were analyzed to have 13.84 grams of fat, representing a retention of 10.15 grams of fat.

For the deep-fried chicken nuggets, the serving size was 108 grams. The uncooked chicken nuggets contained 18.42 grams of fat. The chicken nuggets deep-fried in the Control oil contained 20.4 grams of fat, representing a fat retention of 1.98 grams. The chicken nuggets deep-fried in the Formula 1 oil composition contained 20.19 grams of fat per serving size, representing a retention of 1.77 grams. The chicken nuggets deep-fried in the Formula 2 oil composition were analyzed to have 19.59 grams of fat per serving, representing a retention of 1.17 grams. The chicken nuggets deep-fried in the Formula 3 oil composition had 20.0 grams of fat per serving, an increase of 1.58 grams.

The extent of migration of the phytosterol ester component of the deep frying oil into the onion rings of each of Formula 1, 2 and 3 was determined. The uncooked onion rings contained 358.7 mg of sterols per 100 grams of onion rings for all of the experiments. The baseline for the test was 3,118 mg of sterol per 100 g, while the test onion rings for Formula 1 had 3,336 mg of sterol per 100 g of onion rings. The phytosterols found in the onion rings deep-fried in the Formula 1 oil contained 2.7 grams of phytosterols per 91 gram serving size. This calculates to a percent migration of the phytosterol esters of 95.48 percent, the standard deviation being 35.63.

The onion rings deep-fried in the Formula 2 deep frying oil composition were determined to have a migration of 79.86 percent, representing 4.4 grams of phytosterols per 91 gram serving size, the standard deviation of being 1. In this instance, the test onion rings had 5,190 mg of sterols per 100 g of onion rings, and the baseline value for the test was 6,050 mg/100 g.

The onion rings deep-fried in the Formula 3 deep frying oil composition were determined to experience a migration of 27.70 percent, with the phytosterols per 91 gram serving size being 2.3 grams, this standard deviation being 18.14. The (phytosterols in the uncooked onion rings again was 358.7 grams) the test onion rings had 2,855 mg of sterols per 100 g of onion rings, with the baseline value being 9,010 mg/100 g.

The uncooked chicken nuggets in the runs of Example 1 had 208.9 mg of phytosterols for each of experiments using the oils of the Control and of Formulas 1, 2 and 3. The test baseline values were the same for the chicken nuggets as they were for the onion rings.

The chicken nuggets of the Formula 1 deep frying composition had 2,350 mg of sterols per 100 g of chicken, and the phytosterol present in the chicken nuggets deep-fried in Formula 1 oil was 2.3 grams per serving size. This is a migration of 63.7 percent, the standard deviation being 33.16. The chicken nuggets of the Formula 2 deep fat frying had 4,222 mg sterol per 100 grams; the phytosterol present per serving size was 4.3 grams per serving size, the migration of phytosterols into the deep-fried chicken nuggets being 66.65 percent, at a standard deviation of 0.98. For the chicken nuggets deep-fried in the Formula 3 oil composition, the test chicken had 5,860 mgs sterol per 100 grams, the phytosterol per serving size was 6.1 grams, and the migration was 62.72 percent, a standard deviation 0.43.

FIG. 1 provides a bar graph plot of the total mg of phytosterols present in each test. The Control deep-fried onion rings show a phytosterol ester content close to that of the uncooked onion rings. Each of the Formula 1, 2 and 3 deep-fried onion rings showed a substantial phytosterol ester migration. The phytosterol ester migration into the onion rings deep-fried in the Formula 3 oil composition is unusually low. This is understood to be due to a very high peroxide value (PV) that prevented migration in this particular testing. This Tables I, II and III report data for each of the Control and the Formula 1, 2 and 3 deep frying oils. Each was subjected to the following tests: peroxide value (PV), color (1") yellow, color (1") red, and oxidative stability index (OSI), free fatty acid as oleic acid, as well as polymer, polars and sterol data.

TABLE I

| Oil Description | Formula 1 Baseline | Control Baseline | Formula 1 Heated | Control Heated | Formula 1 Chicken | Control Chicken | Formula 1 Onion | Control Onion |
|---|---|---|---|---|---|---|---|---|
| Peroxide Value | 2 | 0.8 | 1.8 | 1.7 | 1 | 0.8 | 0.6 | 0.7 |
| Color-1" | 1.5Y/0.2r | 1.5Y/0.2R | 1.7Y/0.2r | 1.5Y/0.2R | 3.5Y/0.5r | 3.2Y/0.5R | 6.8Y/1.4r | 5.1Y/1.0R |
| Oxidative Stability | 13.2 | 14.5 | 13.75 | 14.5 | 15.2 | 15.55 | 15.25 | 14.7 |
| Free Fatty Acid Oleic | 0.07 | 0.06 | 0.06 | 0.09 | 0.19 | 0.32 | 0.29 | 0.25 |
| Polymer | 0.04 | ND | 0.04 | ND | ND | ND | ND | ND |
| Polars | ND | ND | 0.06 | 0.05 | 0.35 | 0.25 | 0.53 | 0.4 |
| Sterol | 3118 | 582.3 | 3213 | 576.7 | 2981 | 556.4 | 2834 | 590.2 |

TABLE II

| Oil Description | Formula 2 Baseline | Control Baseline | Formula 2 Heated | Control Heated | Formula 2 Chicken | Control Chicken | Formula 2 Onion | Control Onion |
|---|---|---|---|---|---|---|---|---|
| Peroxide Value | 2.6 | 0.8 | 1.2 | 1.7 | 1 | 0.8 | 0.4 | 0.7 |
| Color-1" | 1.5Y/0.2r | 1.5Y/0.2R | 1.5Y/0.2r | 1.5Y/0.2R | 3.5Y/0.6r | 3.2Y/0.5R | 5.5Y/1.0r | 5.1Y/1.0R |
| Oxidative Stability | 12.95 | 14.5 | 14.25 | 14.5 | 14.25 | 15.55 | 15.8 | 14.7 |
| Free Fatty Acid Oleic | 0.05 | 0.06 | 0.07 | 0.09 | 0.21 | 0.32 | 0.41 | 0.25 |
| Polymer | ND | ND | ND | ND | ND | ND | ND | ND |
| Polars | ND | ND | 0.04 | 0.05 | 0.37 | 0.25 | 0.63 | 0.4 |
| Sterol | 6050 | 582.3 | 6070 | 576.7 | 5730 | 556.4 | 5780 | 590.2 |

TABLE III

| Oil Description | Formula 3 Baseline | Control Baseline | Formula 3 Heated | Control Heated | Formula 3 Chicken | Control Chicken | Formula 3 Onion | Control Onion |
|---|---|---|---|---|---|---|---|---|
| Peroxide Value | 3.4 | 0.8 | 1 | 1.7 | 1 | 0.8 | 0.8 | 0.7 |
| Color-1" | 1.4Y/0.1r | 1.5Y/0.2R | 1.6Y/0.2r | 1.5Y/0.2R | 3.9Y/0.8r | 3.2Y/0.5R | 6.5Y/1.3r | 5.1Y/1.0R |
| Oxidative Stability | 12.6 | 14.5 | 12.75 | 14.5 | 15.45 | 15.55 | 15.1 | 14.7 |
| Free Fatty Acid Oleic | 0.08 | 0.06 | 0.08 | 0.09 | 0.1 | 0.32 | 0.16 | 0.25 |
| Polymer | ND | ND | ND | ND | ND | ND | ND | ND |
| Polars | ND | ND | 0.09 | 0.05 | 0.34 | 0.25 | 0.63 | 0.4 |
| Sterol | 9010 | 582.3 | 7730 | 576.7 | 8560 | 556.4 | 8290 | 590.2 | indicates that there was less unmodified or complete triglyceride available (due to the high PV) for carrying the phytosterol esters into the onion rings.

Figure 2:
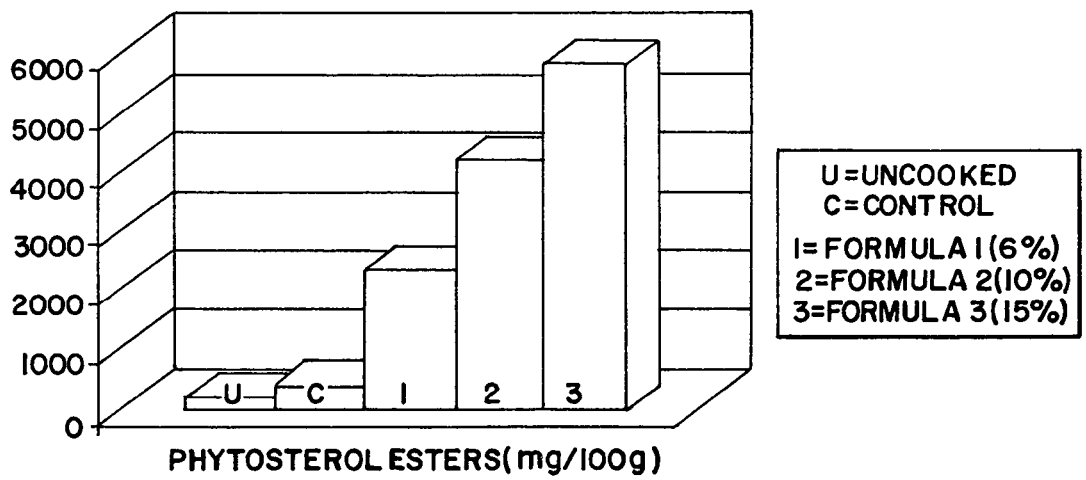
FIG. 2 is a bar graph plot reporting phytosterol ester contents within chicken nuggets deep-fried in different deep frying oil composition.

FIG. 2 is a plot similar to FIG. 1, this showing the phytosterol migration into the chicken nuggets that was accomplished by the deep frying in each of Formulas 1, 2 and 3, compared with that of the uncooked chicken nuggets and the chicken nuggets cooked in the Control deep frying oil. These data show an increase in phytosterols in the chicken nuggets that are generally consistent with the respective levels of phytosterol esters in the Formula. In each of FIG. 1 and FIG. 2, the amounts of phytosterol esters are on the basis of mg/100 g, as opposed to serving size.

Figure 3:
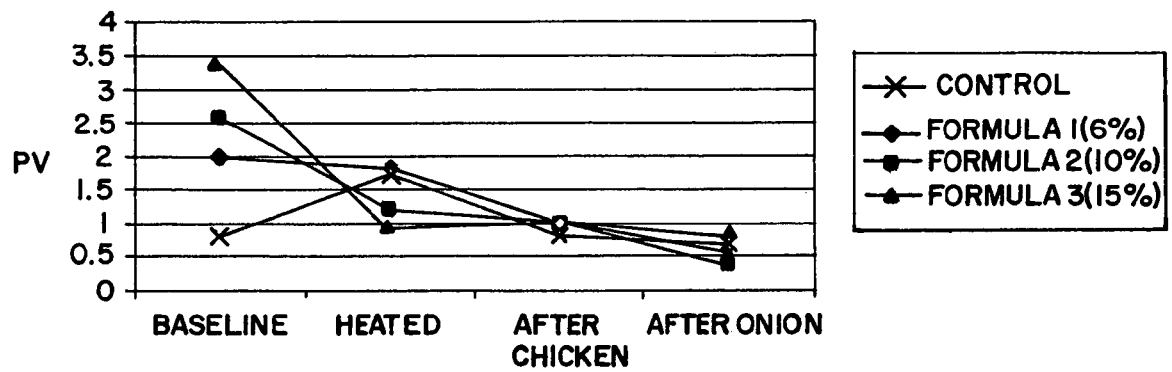
FIG. 3 is a plot of peroxide values for oils, including after deep frying of chicken nuggets and onion rings in different oils.

FIG. 3 is of interest to the effect of peroxide value (PV) in connection with each of the Control and of Formulas 1, 2 and 3. This shows the baseline PV value for each of these deep frying compositions. For Formulas 1, 2 and 3, the PV was either declining or remained generally constant between sample times, while the Control PV increased between baseline and the heated sample. The PV then decreased. This illustrates a general trend toward reduction in PV between the baseline value and the value after initial heating to 350° F., as well as after the runs of deep frying the chicken nuggets and the runs after deep frying the onion rings. These PV data illustrate that the percentage of phytosterol ester had a noticeable impact with respect to the baseline data. This also illustrates that the PV decreased relative to hydroperoxides. It will be noted in the case of Formula 3 that a very high baseline PV is illustrated. In these PV data, a PV of not greater than about 1 is a manageable level.

Figure 4:
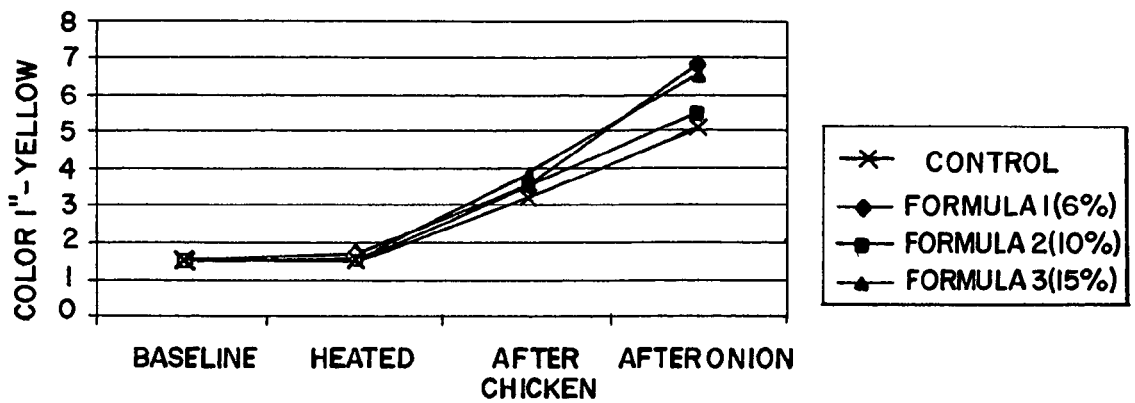
FIG. 4 is a plot of color (1") yellow values of oils after deep frying chicken nuggets and onion rings in different deep frying oils.
Figure 5:
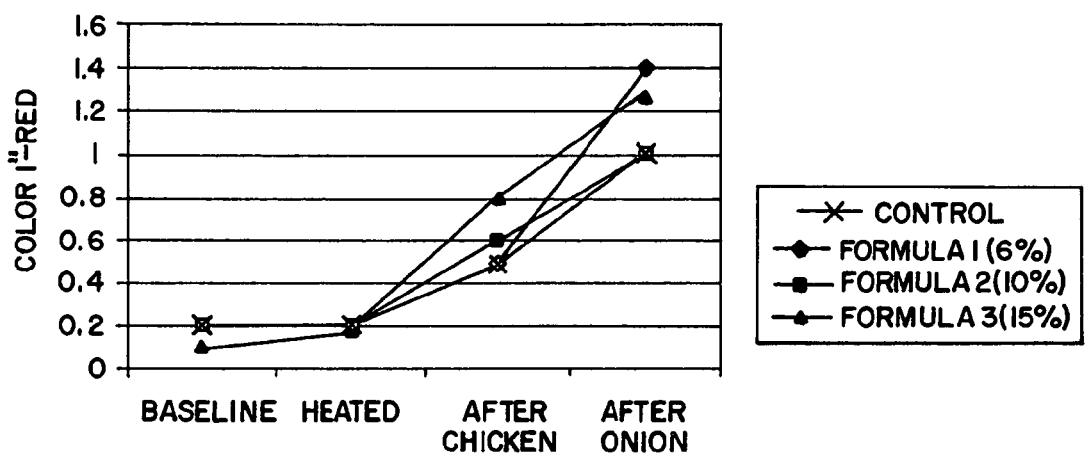
FIG. 5 is a plot of color (1") red values of oils after deep frying chicken nuggets and onion rings in different deep frying oils.

FIG. 4 and FIG. 5 plot color values related to yellow coloration and to red coloration, respectively. These data illustrate the closeness of color attributes for the respective oils after deep-fried chicken nuggets and onion rings, with the Formula 1, 2 and 3 colorations being at least as good as that of the Control. In some instances, the yellow coloration and red coloration is enhanced when deep frying was carried out in the deep frying compositions including the phytosterol esters. FIGS. 4 and 5 show that the color increased at a steady rate across all samples, with the yellow being higher for the phytosterol containing oils, with Formulation a remaining close to the Control.

Figure 6:
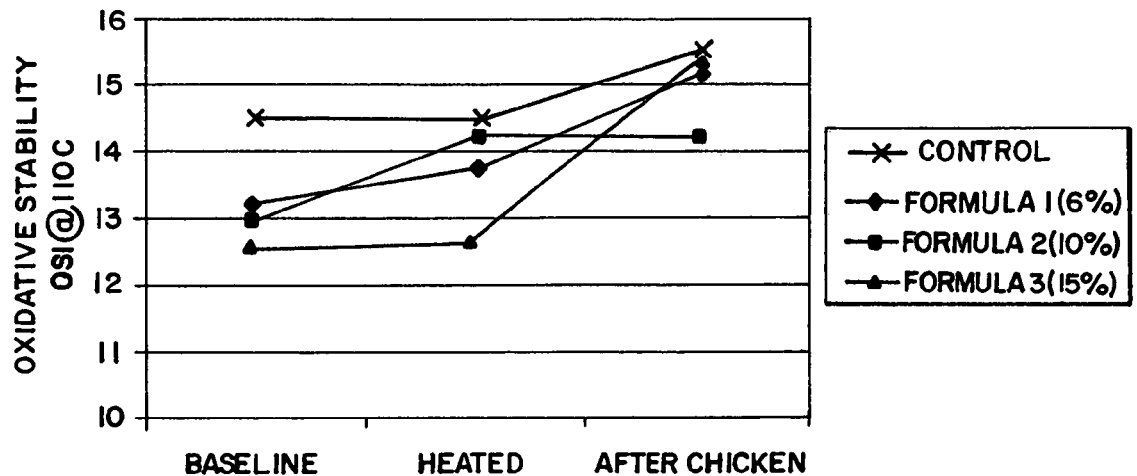
FIG. 6 is a plot of oxidative stability data for a plurality of deep frying oils after deep frying chicken nuggets.
Figure 7:
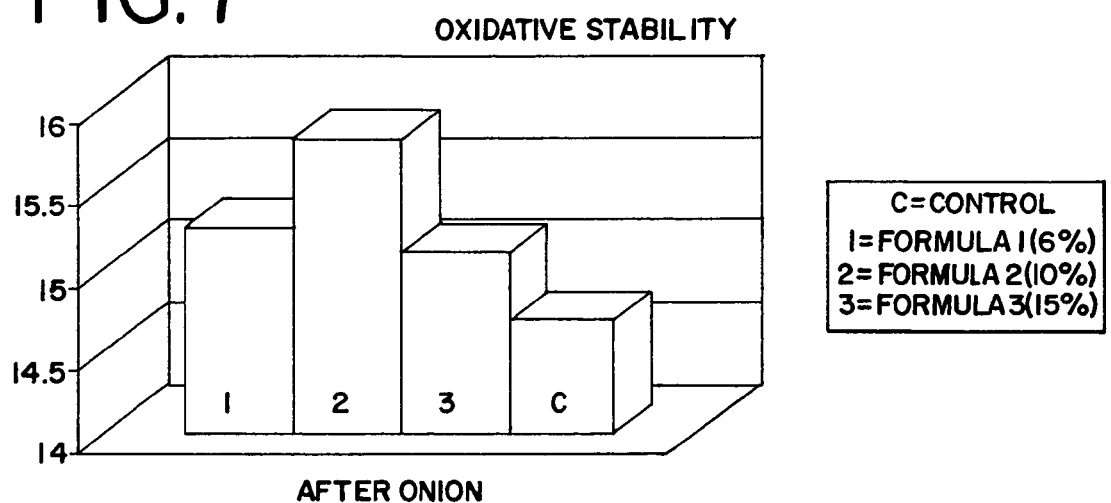
FIG. 7 is a plot of oxidative stability data for a plurality of deep frying oils after deep frying onion rings.

FIG. 6 plots oxidative stability data for each of the Control and Formulas 1, 2 and 3. In each case, the OSI at 110° C. was flat or increased between the baseline value and the heated value and also between the heated value and the value after deep frying of the chicken nuggets. The OSI showed a steady increase for the phytosterol samples. In contrast, OSI for the Control runs showed a steady increase, then peaked at the chicken sample and decreased at the onion sample for this relatively short experimentation time (2.5 to 3 hours). FIG. 7 represents the OSI values for the control and for formulas 1, 2 and 3 after the onion rings deep frying. This shows only a slight variation in the OSI values over this relatively short time frame.

Figure 8:
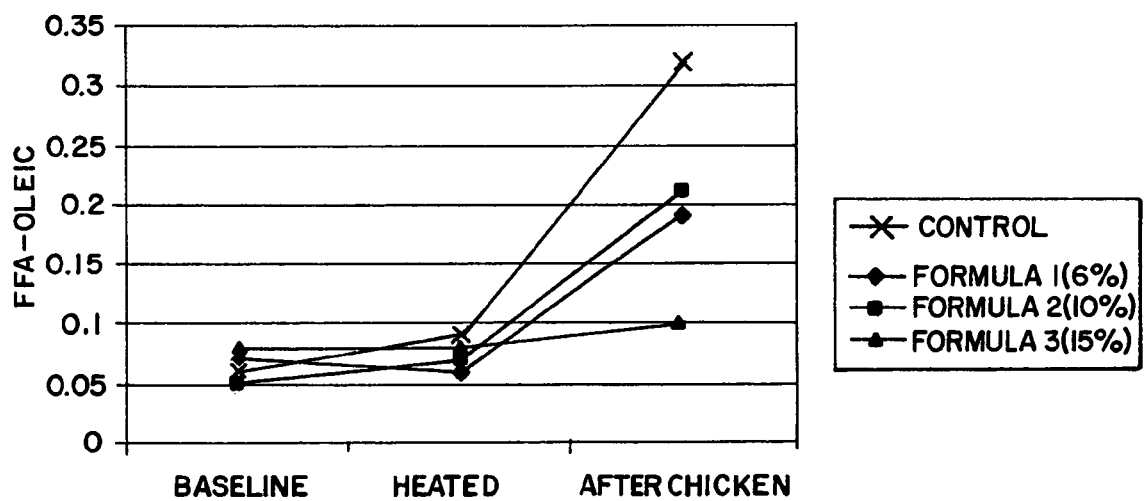
FIG. 8 is a plot of free fatty acid data for a plurality of deep frying oils after deep frying chicken nuggets.
Figure 9:
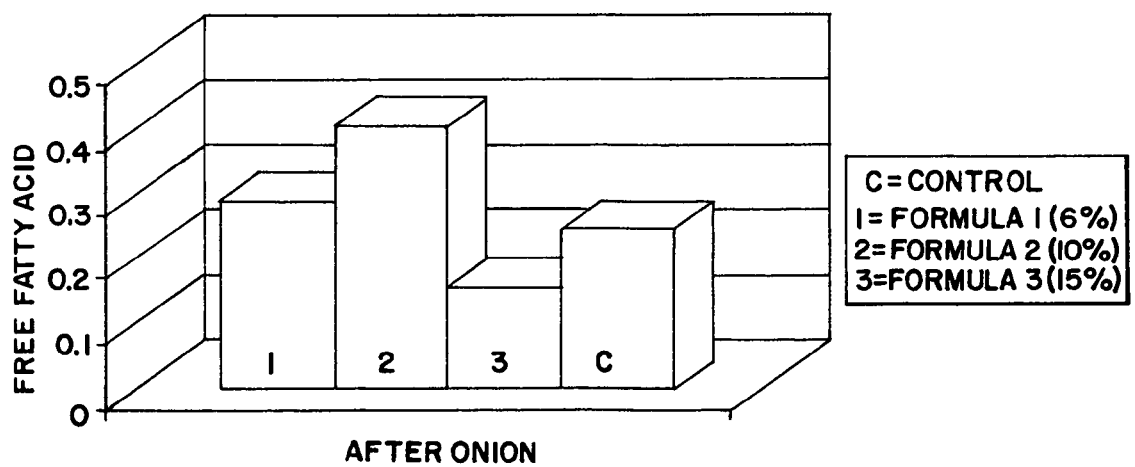
FIG. 9 is a plot of free fatty acid data for a plurality of deep frying oils after deep frying onion rings.

FIG. 8 and FIG. 9 plot data for free fatty acids. FIG. 8 shows that the FFA increase during the sampling process. As noted in Tables 1, II and III, the polymers primarily were not detected, and the polar data show that the addition of the phytosterol esters increased the FOS (Food Oil Sensor—Oil Quality Analyzer) level and not the concentration of the phytosterols. The phytosterol ester data show that the percentages of overall phytosterol esters decreased the least for Formula 2, where the phytosterol ester value was at 10 percent by weight. The percentage lost was approximately 4.5 percent, whereas the percentages lost from the Formula 1 runs and the Formula 3 runs were approximately 9 percent and 8 percent, respectively.

Overall, the data generated indicate that the Formula 2 deep frying composition has certain advantages. The Formula 2 runs indicated no aftertaste, lower oil color, lower PV, higher OSI, less overall phytosterol ester loss, and more consistent phytosterol migration.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A method for making a deep-fried food product having health-promoting attributes, comprising:
providing a deep frying oil component suitable for deep frying of food products therewithin;
combining said deep frying oil component with a phytosterol component to provide a deep frying oil composition, said phytosterol component being in the form of one or more phytosterol esters, said combining being such that said deep frying oil composition contains at least about 80 weight percent of said deep frying oil component and between about 8 and about 12 weight percent of said phytosterol component, based on the total weight of the deep frying oil composition;
deep frying a food product within said deep frying oil composition while transferring within said food product at least about 50 weight percent of said phytosterol component present in said deep frying oil composition; and
thereby providing a deep-fried food product containing a quantity of said phytosterol component that has a health promoting effect, said health-promoting effect including lowering LDL-cholesterol in an individual who follows a diet that includes regular consumption of said deep-fried food product.

2. The method in accordance with claim 1, wherein said providing of deep frying oil provides domestic oil having carbon chain lengths of between C16 and C22.

3. The method in accordance with claim 1, wherein said deep frying oil is selected from the group consisting of soybean oils, corn oils, cottonseed oils, canola oils, olive oils, peanut oils, safflower oils, sunflower oils, oils from grain plants, and combinations thereof.

4. The method in accordance with claim 1, wherein said phytosterol ester component has no greater than about 20% by weight, based upon the total weight of the phytosterol ester component, of a phytostanol.

5. The method in accordance with claim 1, wherein said deep-fried food product reduces total cholesterol adsorption in individuals.

6. The method in accordance with claim 1, wherein said deep-fried food product is administered to an individual at a level to provide to the individual at least about 100 milligrams of said phytosterol component per product reference amount, based upon the total weight of the phytosterol component present in the deep-fried food product.

7. The method in accordance with claim 1, wherein said deep frying oil composition has sensory attributes which are not significantly different from, or are significantly superior to, corresponding sensory properties of said deep frying oil.

8. The method in accordance with claim 1, wherein said deep-fried food product has sensory attributes which are not significantly different from, or are significantly superior to, corresponding sensory properties of a like fried food product deep-fried in said deep frying oil.

9. The method in accordance with claim 1, wherein said deep frying oil composition contains between about 82 and about 95 weight percent of said deep frying oil component.

10. The method in accordance with claim 1, comprising transferring at least about 60 weight percent of said phytosterol component present in said deep frying oil composition into said deep-fried product.

11. The method in accordance with claim 1, wherein said deep frying is at about 350° F. (about 177° C.) and above.

12. A method for using a deep frying oil composition for making a deep-fried food product having health-promoting attributes, comprising:
providing a deep frying oil component suitable for deep frying of food products therewithin;
combining said deep frying oil component with a phytosterol component to provide a deep frying oil composition, said phytosterol component being in the form of one or more phytosterol esters, said combining being such that said deep frying oil composition contains at least about 80 weight percent of said deep frying oil component and between about 8 and about 12 weight percent of said phytosterol component, based on the total weight of the deep frying oil composition;
deep frying a food product within said deep frying oil composition while transferring within said food product at least about 50 weight percent of said phytosterol component present in said deep frying oil composition; and ingesting by an individual on a regular consumption basis a deep-fried food product containing a quantity of said phytosterol component that has a health-promoting effect, said health-promoting effect including lowering LDL-cholesterol in the individual.

13. The method in accordance with claim 12, wherein said ingesting of the deep-fried food product reduces total cholesterol absorption in the individual.

14. The method in accordance with claim 12, wherein said ingesting reduces LDL-cholesterol adsorption by the individual.

15. The method in accordance with claim 12, wherein said ingesting is at a level to provide to the individual at least about 100 milligrams of said phytosterol component per product reference amount, based upon the total weight of the phytosterol component present in the deep-fried food product.

16. The method in accordance with claim 12, wherein said deep frying oil composition contains between about 82 and about 95 weight percent of said deep frying oil component.

17. The method in accordance with claim 12, comprising transferring at least about 60 weight percent of said phytosterol component present in said deep frying oil composition into said deep-fried product.

18. The method in accordance with claim 12, wherein said deep frying oil composition has sensory attributes which are not significantly different from, or are significantly superior to, corresponding sensory properties of said deep frying oil component.

19. A deep-fried food product having health-promoting attributes,
    said deep-fried food product having been made by a process comprising:
    (i) providing a deep frying oil component suitable for deep frying of food products therewithin,
    (ii) combining said deep frying oil component with a phytosterol component to provide a deep frying oil composition, said phytosterol component consisting essentially of one or more phytosterol esters, said combining being such that said deep frying oil composition contains at least about 80 weight percent of said deep frying oil component and between about 8 and about 12 weight percent of said phytosterol component, based on the total weight of the deep frying oil composition, and
    (iii) deep frying a food product within said deep frying oil composition while transferring at least about 50 weight percent of said phytosterol component present in said deep frying oil composition to prepare a deep-fried food product;
    said deep-fried food product contains a quantity of said phytosterol component; and
    said deep-fried food product has a health-promoting effect, said health-promoting effect including lowering LDL-cholesterol in an individual who follows a diet that includes regular consumption of said deep-fried food product.

20. The deep-fried food product of claim 19, wherein said deep-fried food product reduces total cholesterol adsorption in individuals.

21. The deep-fried food product of claim 19, wherein said quantity of said phytosterol component provides to the individual to provide to the individual at least about 100 milligrams of said phytosterol component per product reference amount, based upon the total weight of the phytosterol component present in the deep-fried food product.

22. The deep-fried food product of claim 19, wherein said deep-fried food product has sensory attributes which are not significantly different from, or are significantly superior to, corresponding sensory properties of a like fried food product deep-fried in said deep frying oil.

23. The deep-fried food product in accordance with claim 19, comprising transferring at least about 60 weight percent of said phytosterol component present in said deep frying oil composition into said deep-fried product.

24. A deep-fried food product having health-promoting attributes, comprising:
    a food product that is a deep-tried food product that had been cooked in accordance with deep frying procedures;
    said deep-fried food product having therewithin a phytosterol component that has a health-promoting effect, said health-promoting effect including lowering LDL-cholesterol in an individual who follows a diet that includes regular consumption of said deep-fried food product
    said deep-fried food product having had transferred thereinto during deep frying in a deep frying oil composition at least about 50 weight percent of a phytosterol component that had been present in said deep frying oil composition, the deep frying oil composition comprising at least about 80 weight percent of a deep frying oil component and between about 8 and about 12 weight percent of a phytosterol component, said phytosterol component being in the form of one or more phytosterol esters, based on the total weight of the deep frying oil composition; and
    said deep-fried food product contains a quantity of said phytosterol component that has a health-promoting effect, said health-promoting effect including lowering LDL-cholesterol in an individual who follows a diet that includes regular consumption of said deep-fried food product.

25. The deep-fried food product in accordance with claim 24, wherein said deep-fried food product reduces total cholesterol adsorption in individuals.

26. The deep-fried food product of claim 24, wherein said quantity of said phytosterol component provides to the individual to provide to the individual at least about 100 milligrams of said phytosterol component per product reference amount, based upon the total weight of the phytosterol component present in the deep-fried food product.

27. The deep-fried food product in accordance with claim 24, wherein said deep-fried food product has sensory attributes which are not significantly different from, or are significantly superior to, corresponding sensory properties of a like fried food product deep-fried in said deep frying oil.

28. The deep-fried food product in accordance with claim 24, comprising transferring at least about 60 weight percent of said phytosterol component present in said deep frying oil composition into said deep-fried product.

* * * * *